US010296247B2

(12) United States Patent
Caporale et al.

(10) Patent No.: US 10,296,247 B2
(45) Date of Patent: May 21, 2019

(54) SECURITY WITHIN STORAGE AREA NETWORK HAVING FABRIC-ATTACHED STORAGE DRIVES, SAN AGENT-EXECUTING CLIENT DEVICES, AND SAN MANAGER

(71) Applicant: Lenovo Enterprise Solutions (Singapore) PTE. LTD., New Tech Park (SG)

(72) Inventors: Patrick Leo Caporale, Cary, NC (US); Michael Neil Condict, Hurdle Mills, NC (US); David W. Cosby, Raleigh, NC (US); Jonathan Randall Hinkle, Morrisville, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 230 days.

(21) Appl. No.: 15/357,267

(22) Filed: Nov. 21, 2016

(65) Prior Publication Data

US 2018/0143776 A1 May 24, 2018

(51) Int. Cl.
*G06F 3/00* (2006.01)
*G06F 3/06* (2006.01)
*G06F 21/62* (2013.01)

(52) U.S. Cl.
CPC ............ *G06F 3/0622* (2013.01); *G06F 3/067* (2013.01); *G06F 3/0631* (2013.01); *G06F 3/0659* (2013.01); *G06F 21/6218* (2013.01); *G06F 21/6236* (2013.01)

(58) Field of Classification Search
USPC ........................................................ 711/154
See application file for complete search history.

(56) References Cited

U.S. PATENT DOCUMENTS

| 6,151,659 | A | 11/2000 | Solomon et al. |
| 6,889,309 | B1 | 5/2005 | Oliveira et al. |
| 7,702,906 | B1 * | 4/2010 | Karr ........................ H04L 67/10 |
| | | | 713/164 |

(Continued)

OTHER PUBLICATIONS

US 10,019,328 B1, 07/2018, Condict et al. (withdrawn)

(Continued)

*Primary Examiner* — David Yi
*Assistant Examiner* — Craig S Goldschmidt
(74) *Attorney, Agent, or Firm* — Jason Friday

(57) ABSTRACT

A storage-area network (SAN) system includes one or more storage drives directly connected to a fabric. Each storage drive provisions and operates a drive volume, and creates a security token for the drive volume. The system includes a client computing device directly connected to the fabric, and that executes a SAN software agent to create, mount, and use a logical volume realized by drive volumes of the storage drives. The client computing device accesses each drive volume using the security token for the drive volume. The system includes a SAN manager directly connected to the fabric that manages the drive volumes of the storage drives, manages the logical volume that the SAN software agent operates, receives from each storage drive the security token for the drive volume of the storage drive, and sends the security token for the drive volume of each storage drive to the SAN software agent.

19 Claims, 6 Drawing Sheets

(56) References Cited

U.S. PATENT DOCUMENTS

| | | |
|---|---|---|
| 9,448,735 B1 | 9/2016 | Proulx et al. |
| 9,727,379 B1 | 8/2017 | Wilkes et al. |
| 9,983,807 B1 | 5/2018 | Tylik et al. |
| 10,042,721 B2 | 8/2018 | Condict et al. |
| 2001/0019614 A1* | 9/2001 | Madoukh .......... G06F 17/30067 380/277 |
| 2005/0193128 A1 | 9/2005 | Dawson et al. |
| 2006/0282636 A1 | 12/2006 | Yamamoto et al. |
| 2007/0206224 A1 | 9/2007 | Nagashima et al. |
| 2012/0233463 A1 | 9/2012 | Holt et al. |
| 2013/0067187 A1 | 3/2013 | Moss et al. |
| 2015/0288783 A1 | 10/2015 | Ma et al. |
| 2016/0004475 A1 | 1/2016 | Beniyama et al. |
| 2018/0107409 A1 | 4/2018 | Condict et al. |
| 2018/0150244 A1 | 5/2018 | Caporale et al. |
| 2018/0205603 A1 | 7/2018 | Condict et al. |
| 2018/0260123 A1 | 9/2018 | Andresen et al. |

OTHER PUBLICATIONS

Brown, K. , "Fabric Attached Storage: The Convergence of NAS & SAN", COMNET Washington DC., Jan. 28, 2002, 15 pp.

Cooke, A., "An Introduction to Scale-Up vs. Scale-Out Storage", Enterprise Storage Guide, online <http://www.enterprisestorageguide.com/introduction-scale-vs-scale-storage>, Mar. 6, 2014, 5 pp.

Wilmsen, M., "Hyper converged vs. traditional SAN/NAS?", Virtual Hike, online <http://virtual-hike.com/hyper-converged-or-a-traditional-sannas/>, Jun. 4, 2015, 2 pp.

U.S. Appl. No. 15/295,596, filed Oct. 17, 2016, 68 pp.

U.S. Appl. No. 15/084,908, filed Mar. 30, 2016, 63 pp.

U.S. Appl. No. 15/451,718, filed Mar. 7, 2017, 65 pp.

U.S. Appl. No. 15/365,333, filed Nov. 30, 2016, 68 pp.

U.S. Appl. No. 15/406,299, filed Jan. 13, 2017, 62 pp.

Crowley, P. "Programmable Peripheral Devices," http://www.cs.wustl.edu/~pcrowley/papers/generals.pdf, dated no later than May 14, 2014.

Hot spare, Wikipedia.com, <https://en.wikipedia.org/wiki/Hot_spare>, last edited Nov. 13, 2015, accessed Jan. 11, 2016, 2 pp.

Rashmi, K.V. et al., "A "Hitchhiker's" Guide to Fast and Efficient Data Reconstruction in Erasure-coded Data Centers", SIGCOMM'14, Aug. 17-22, 2014, Chicago, USA, 12 pp.

Khasymski, A. et al., "Realizing Accelerated Cost-Effective Distributed RAID", Handbook on Data Centers. Springer New York, 2015. 24 pp.

Yu Hu, Xiao et al., "Efficient Implementations of the Sum-Product Algorithm for Decoding LDPC Codes", IBM Research, Zurich Research Laboratory, CH-8803 Ruschlikon, Switzerland, IEEE 2001, 6 pp.

Bryant, C., "HGST Demos Ethernet as a Storage Drive Interface", tom's IT PRO, online <http://www.tomsitpro.com/articles/hgst-10gbps-ethernet-cloud-stor . . . >, 4 pp.

Swartz, K.L., "3PAR Fast RAID: High Performance Without Compromise", 2010, 3PAR Inc., 11 pp.

Introduction to Toshiba Key Value Drive Technology, Toshiba Corporation, May 2015, 13 pp.

Storage Monitoring for HDDs and RAID Controllers, Oracle Storage Monitoring and Zone Management, online <https://docs.oracle.com/cd/E19201-01/820-6410-12/ilom_storagemonitor . . . >, copyright 2010, accessed Nov. 1, 2016, 9 pages.

Armstrong, A., "Toshiba Announces Key Value-Based Technology for Object Storage", online <http://www.storagereview.com/toshiba_announces_key_valuebase . . . >, May 18, 2015, 2 pp.

Whitepaper, Key Value Drive, Toshiba Corporation, May 2015, 10 pp.

\* cited by examiner

SECURITY WITHIN STORAGE AREA NETWORK HAVING FABRIC-ATTACHED STORAGE DRIVES, SAN AGENT-EXECUTING CLIENT DEVICES, AND SAN MANAGER

BACKGROUND

Data is the lifeblood of many entities like businesses and governmental organizations, as well as individual users. To store large amounts of data, many enterprises and other organizations rely upon storage-area networks (SANs). A SAN is a network that provides access to consolidated, block-level data storage of a number of different storage drives. The storage is provided as a logical volume, or logical unit number (LUN), which is a virtual storage drive. To a computing device like a server, which is a client computing device within the SAN, the virtual storage drive appears as a locally attached storage drive.

SUMMARY

An example storage-area network (SAN) system includes fabric-attachable storage drives directly connected to a fabric. Each storage drive is to provision and operate a drive volume, and to create a security token for the drive volume. The SAN system includes a client computing device directly connected to the fabric. The client computing device is to execute a SAN software agent to create, mount, and use a logical volume realized by drive volumes of the storage drives. The client computing device accesses each drive volume using the security token for the drive volume. The SAN system includes a SAN manager directly connected to the fabric. The SAN manager is to manage the drive volumes of the storage drives, to manage the logical volume that the SAN software agent operates, to receive from each storage drive the security token for the drive volume of the storage drive, and to send the security token for the drive volume of each storage drive to the SAN software agent.

An example method includes receiving, by a SAN manager running on a computing device directly connected to a fabric, a request from an administrator to allocate and mount a logical volume on a client computing device directly connected to the fabric. The method includes sending, by the SAN manager, a command to each storage drive of one or more storage drives to provision a drive volume to store data of the logical volume, each storage drive directly connected to the fabric. The method includes receiving, by the SAN manager, a security token from each storage drive. The security token of each storage drive permits access to the drive volume provisioned on the storage drive. The method includes sending, by the SAN manager, the security token of each storage drive and a command to a SAN software agent on the client computing device to create and mount the logical volume using the drive volumes provisioned on the storage drives.

An example non-transitory computer-readable data storage medium stores computer-executable code that a client computing device executes to perform a method. The method includes receiving by a SAN software agent running on the client computing device and from a SAN manager directly connected to a fabric to which the client computing device is connected, a command to create and mount a logical volume using one or more drive volumes provisioned on corresponding storage drives directly connected to the fabric. The method includes receiving, by the SAN software agent running on the client computing device, a security token of each storage drive for the drive volume provisioned on the storage drive. The method includes, in response to receiving the command and the security token of each storage drive for the drive volume provisioned on the storage drive, creating and mounting, by the SAN software agent, the logical volume using the drive volumes provisioned on the storage drives, via the security tokens of the storage drives for the drive volumes.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
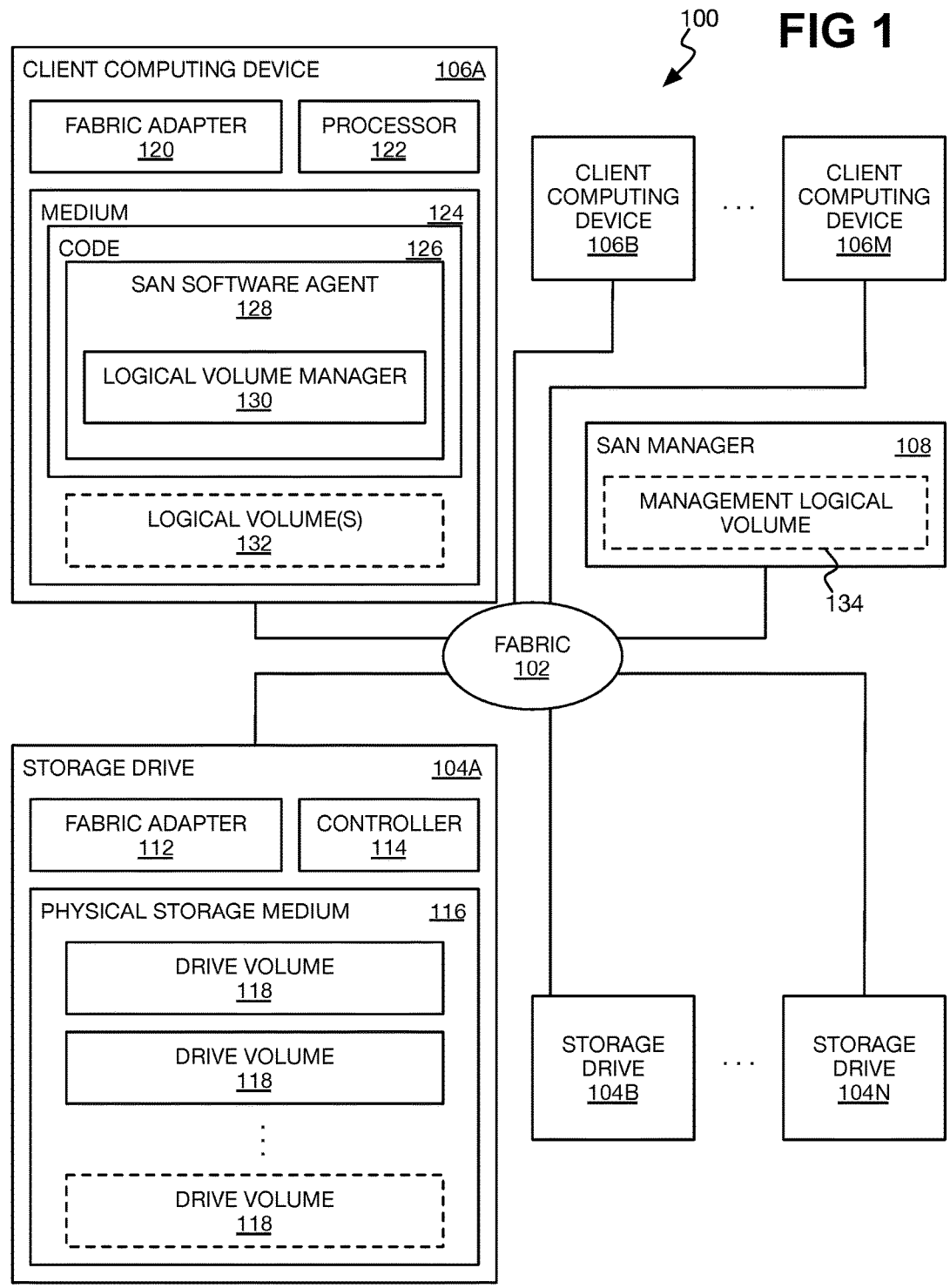
FIG. 1 is a diagram of an example distributed storage-area network (SAN) system.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a SAN is a network by which the physical storage of different storage drives is accessible to client computing devices on a consolidated, block-level basis as virtual storage drives that the client computing devices can treat similarly to locally attached storage drives. A SAN cluster can include a storage controller and multiple storage drives. The storage controller hides the complexity of the underlying implementation of the logical storage drives from the client computing devices. Therefore, features such as fault tolerance via a redundant array of independent disks (RAID), high availability, thin provisioning, transparent migration, snapshotting, and disaster recovery can be provided at the SAN cluster level via the storage controller.

As storage drives such as solid-state drives have increased in performance, different strategies have been employed to realize these performance benefits within SANs. One such strategy is described in the patent application entitled "storage area network having fabric-attached storage drives, SAN-agent executing client devices, and SAN manager," filed on Oct. 17, 2016, and assigned patent application Ser. No. 15/295,596, which is hereby incorporated by reference. This strategy specifically realizes a distributed SAN.

Such a SAN system includes fabric-attachable storage drives that are each directly connected to a fabric. Client computing devices are also directly connected to the fabric, as is a SAN manager. Each client computing device runs a SAN software agent. The SAN manager manages drive volumes that the storage drives may thinly provision, and further manages logical volumes that the SAN software agents create from the drive volumes. The SAN software agent of a client computing device handles input/output (I/O) requests generated within the client device for a logical volume, and directly accesses the drive volumes on the storage drives that realize the logical volume, without involving the SAN manager.

As such, management of the drive volumes occurs at the SAN manager level, but allocation and deallocation of the drive volumes occurs at the storage drives themselves under direction of the SAN manager. Similarly, management of the logical volumes occurs at the SAN manager level, but allocation and deallocation of the logical volumes occurs at the client computing devices themselves, by their SAN software agents under direction of the SAN manager. This means that higher-level storage functionality like fault tolerance, high availability, snapshotting, and so on, is achieved by the SAN software agents themselves. I/O access to the drive volumes that make up a logical volume occurs through the SAN software agent of the client computing device at which the I/O access originates.

Such a distributed SAN approach centralizes just the management of drive volumes and logical volumes that are realized by the drive volumes, although a SAN manager itself may be implemented in a distributed manner. The storage drives maintain their own drive volumes, and can even be unaware that they are participating in a SAN and as such may be unaware that there are other storage drives maintaining their own drive volumes. The client computing devices, via their SAN software agents, maintain their own logical volumes, and thus can individually and selectively provide for the higher-level storage functionality desired, if any, although multiple client devices can share (i.e., mount) the same logical volumes.

From the perspective of a storage drive, the storage drive maintains multiple drive volumes that the storage drive thinly provisions. The storage drive allocates and deallocates the drive volumes at the behest of the SAN manager. The storage drive writes data to and retrieves data from its drive volumes at the behest of the SAN software agents of the client computing devices. From the perspective of a client computing device, the SAN storage agent running thereon can maintain multiple logical volumes. The SAN storage agent allocates and deallocates the logical volumes at the behest of the SAN manager, using the drive volumes of the storage drives as the SAN manager directs.

Because such a SAN is distributed over a number of devices directly connected to a fabric, including the storage drives, the client computing devices on which the SAN software agents are executed, and potentially a separate computing device on which the SAN manager is executed, security can pose a bigger issue than within a non-distributed SAN. For instance, in a non-distributed SAN, a storage controller may act as a gatekeeper through which all I/O requests to data stored on storage drives pass. Therefore, security can be centralized at the storage controller, insofar as data stored on the storage drives is inaccessible except through the controller.

However, in a distributed SAN in which data access occurs between client computing devices and storage drives without the involvement of or intervention by the SAN manager, the SAN manager does not act as a gatekeeper through which I/O requests to data stored on the storage drives pass. As such, security cannot be centralized at the SAN manager of a distributed SAN in a manner similar to which security is centralized at a storage controller within a non-distributed SAN. Furthermore, because the storage drives themselves are directly connected to and thus accessible on the fabric, such a storage drive cannot just respond to any I/O request it receives and assume that the originator of the request is permitted to access the data that the drive stores.

Disclosed herein are techniques that provide for security within a distributed SAN. A storage drive creates a security token for a drive volume that it has or will be provisioning, sends the security token to the SAN manager. The SAN manager in turn sends the security token to the SAN software agent of a client computing device that is to create a logical volume using (at least) the drive volume in question. The client computing device accesses the drive volume using the security token that it has been provided.

In one implementation, the security token that the SAN manager receives from the storage drive and provides to the SAN software agent is an access security token that directly permits access to the drive volume provisioned on the storage drive. Therefore, each time the client computing device accesses the drive volume, its SAN software agent passes the access security token to the storage drive. The storage drive permits access to the drive volume only if this access security token is presented. In this implementation, because the SAN manager originally received the access security token from the storage drive before providing it to the client computing device, the drive volume—including the data stored thereon—is also accessible by the SAN manager.

By comparison, in another implementation, the security token that the SAN manager receives from the storage drive and provides to the SAN software agent is an administrator security token that permits acquisition of an access security token which itself directly permits access to the drive volume on the storage drive. The SAN software agent requests the access security token for the drive volume by providing the storage drive with this administrator security token. Responsive to receiving the administrator security token, the storage drive may create the access security token and return it to the client computing device.

Thereafter, each time the client computing device accesses the drive volume its SAN software agent passes the access security token to the storage drive. The storage drive permits access to the drive volume only if this access security token is presented. In this implementation, the SAN manager does not have access to the drive volume, such as the data stored thereon. This is because the SAN manager is not privy to the access security token, which the storage drive sends directly to the client computing device's SAN software agent, and which the SAN software agent may not share with the SAN manager.

The administrator security token for the drive volume may permit acquisition of the access security token just once. That is, the first time the storage drive receives the administrator security token, the storage drive creates the access security token and returns the access security token to the client computing device. Subsequent presentments of the same administrator security token do not result in the creation or return of the access security token for the drive volume. Therefore, just the client computing device can access the drive volume.

Even if a nefarious device—including the computing device on which the SAN manager is implemented—intercepts and/or presents the administrator security token to the storage drive before the legitimate client computing device presents the administrator security token, no data is compromised. This is because the legitimate client computing device will not at that time have created and mounted a logical volume using the drive volume of the storage drive, such that there is no data to be compromised. If the legitimate client computing device were to subsequently present the administrator security token to the storage drive after a rogue device has already presented the administrator security token, the storage drive will not honor the legitimate device's presentment. Therefore, the legitimate device will not be able to create and mount a logical volume using the drive volume that has been compromised.

FIG. 1 shows an example distributed SAN system 100. The system 100 includes a fabric 102. The fabric 102 can be a fibre channel fabric, a fibre channel over Ethernet (FCoE) fabric, an Internet small computer system interface (iSCSI) fabric, a serial attached SCSI (SAS) fabric, an InfiniBand fabric, a non-volatile memory Express (NVMe) over Ethernet or fibre channel fabric, or another type of fabric. In general, the fabric 102 is a SAN fabric.

Storage drives 104A, 104B, . . . , 104N, which are collectively referred to as the storage drives 104, are each directly connected to and directly addressable on the fabric 102. Reference to a singular storage drive 104 herein pertains to any of the storage drives 104 individually. Client computing devices 106A, 106B, . . . , 106M, which are collectively referred to as the client computing devices 106, are also each directly connected to the fabric 102. Reference to a singular computing device 106 herein pertains to any of the client computing device 106 individually. There may be more or fewer computing devices 106 than storage drives 104. A SAN manager 108 is also directly connected to the fabric 102.

The storage drive 104A is described herein in detail as representative of each storage drive 104. The storage drive 104A includes a fabric adapter 112, which is the hardware that permits the storage drive 104A to directly connect to the fabric 102. The storage drive 104A includes a controller 114, which can be implemented as a general-purpose processor executing code from memory, as an application-specific integrated circuit (ASIC), as a field-programmable gate array (FPGA), or in another manner. The storage drive 104A includes a physical storage medium 116, which is a non-volatile medium, such as a magnetic medium like one or more hard disk drive platters, or semiconductor memory like a number of semiconductor ICs of the type found in a solid-state drive (SSD). The physical storage medium 116, however, may not be a complete hard disk drive or SSD in and of itself.

The controller 114 is able to provision, such as thinly provision, as well as deprovision drive volumes 118 on the physical storage medium 116 responsive to commands that the controller 114 receives over the fabric 102 via the fabric adapter 112. Thin provisioning in particular creates sparse drive volumes 118, and is a manner by which available physical storage space on the storage medium 116 is allocated based on the minimum space required by any drive volume 118 at any time. The drive volumes 118 of the storage drives 104 physically store the data within the SAN system 100 of FIG. 1. Responsive to commands that the controller 114 receives over the fabric 102 via the fabric adapter 112, the controller 114 also is able to access data in relation to the drive volumes 118, including reading, writing, updating, and deleting the data.

The storage drive 104A thus operates the drive volumes 118 thereon, which means that the controller 114 is able to provision and deprovision the drive volumes 118 as well as is able to access data in relation to the drive volumes 118, responsive to commands received over the fabric 102. The storage drive 104A exposes or exports access to the physical storage medium 116 on a storage block-level basis. As such, once a drive volume 118 has been provisioned, access of data in relation to the drive volume 118 occurs on a block-level basis.

An example of a storage drive 104A is an NVMe storage drive that is programmable and exports access thereto via the NVMe over fabrics network protocol. This protocol provides support for allocation and deallocation of namespaces. The namespaces functionally correspond to SCSI LUNs, and thus can be used to implement the drive volumes 118.

Another example of a storage drive 104A is an Ethernet-attached programmable storage drive. A programmable storage drive can be one that lacks a SATA interface or other type of interface that is commonly found in "dumb" disk drives to interface with a bus of a host computing device. Rather, a programmable storage drive may lack any type of external interface to which to connect directly to a bus of a host computing device, and instead may have just the fabric adapter 112 to connect to the fabric 102. In this respect, a programmable storage drive differs from a conventional network-attached storage (NAS), which generally includes therein one or more separate "dumb" disk drives that are connected to a bus, such as a SATA bus, via corresponding interfaces.

The programmability of a programmable storage drive can be used, for instance, to implement an iSCSI target that supports multiple logical unit numbers (LUNs), and network commands to provision and deprovision (i.e., allocate and deallocate) the LUNs. The drive volumes 118 can be implemented as files within a local file system of the programmable storage drive. Such files are thinly provisioned, since storage for blocks of files is not allocated until a file block is written. A programmable storage drive that runs the Linux operating system, for instance, can implement a Linux-I/O target (LIO) SCSI target to achieve this.

A third example of a storage drive 104A is an enclosure that contains one or more non-programmable storage drives. The enclosure can include firmware or software that permits access over the fabric 102 to the each non-programmable storage drive individually, in a "just a bunch of drives" (JBOD) manner. For example, the non-programmable storage drives may be NVMe drives, with the firmware or software of the enclosure implementing the NVMe over fabrics protocol, so that each NVMe drive is separately exposed on the fabric 102.

A fourth example of a storage drive 104A is a hyper-converged computing device. The physical storage of the storage drives locally attached to the computing device is used within the computing device itself. However, the computing device also exports access to the physical storage, such as via iSCSI, via the NVMe over fabrics protocol, or in another manner.

The client computing device 106A is described herein in detail as representative of each client computing device 106. The client computing device 106A can be a server computing device or system, and is considered a client computing device in that within the SAN of FIG. 1, it is a client of the (host) storage drives 104 that store data on physical storage media 116. The client computing device 106A includes a fabric adapter 120, which is hardware that permits the computing device 106A to directly connect to the fabric 102. The client computing device 106A includes a processor 122, such as a general-purpose processor, and a non-transitory computer-readable data storage medium 124, which may include volatile and/or non-volatile such media. The processor 122 executes computer-executable code 126 from the medium 124.

The computer-executable code includes a SAN software agent 128 that operates in relation to logical volumes 132. The SAN software agent 128 can include a logical volume manager 130. The logical volume manager 130 can be part of an operating system running on the client computing device 106A, and is a software component that can allocate, deallocate, resize, and perform other functionality in relation to logical volumes 132. The logical volume manager 130 can alone or in conjunction with other parts of the operating system implement higher-level storage functionality in relation to the logical volumes 132, such as redundancy and fault tolerance like RAID, high availability, snapshotting, deduplication, compression, encryption, mirroring, and so on.

The SAN software agent 128 interacts with the logical volume manager 130 to realize the logical volumes 132 on the drive volumes 118 of the storage drives 104. The SAN software agent 128 may be integrated within the operating system running on the client computing device 106A. The SAN software agent 128 receives commands over the fabric 102 to commission (and decommission) logical volumes 132 using specified drive volumes 118 on the storage drives 104. In response to such commands, the SAN software agent 128 controls the logical volume manager 130 to effectuate the logical volumes 132 at the client computing device 106A.

The SAN software agent 128 likewise controls the logical volume manager 130 or other component(s) of the operating system to effectuate higher-level storage functionality that the logical volumes 132 should have. For example, a logical volume 132 may be specified as a RAID volume realized by five drive volumes 118 of five different storage drives 104. The SAN software agent 128 thus controls the logical volume manager (or other component(s) of the operating system) to create a logical volume 132 at the client computing device 106A that achieves such RAID using the drive volumes 118 in question.

In response to access of the logical volumes 132 at the client computing device 106A, such as via I/O requests to read data from or write data to the logical volumes 132 generated by applications running on the computing device 106A, the SAN software agent 128 (such as the logical volume manager 130 thereof) sends commands over the fabric 102 to the appropriate storage drives 104, based on the configuration of the logical volumes 132 via the logical volume manager 130. The SAN software agent 128 thus handles I/O requests pertaining to data between the client computing device 106A and the storage drives 104. In effect, the SAN software agent 128 is a portion of a SAN controller, but just in relation to the logical volumes 132 allocated at the client computing device 106A. The SAN software agent 128 does not perform SAN controller functionality for any client computing device 106 other than the client computing device 106A of which it is a part.

The logical volumes 132 are depicted by dashed lines in FIG. 1 to indicate that while they are logically defined at the client computing device 106A, the underlying physical storage of the logical volumes 132 does not reside at the client computing device 106A. Rather, each logical volume 132 is physically implemented on one or more the physical storage media 116 of one or more storage drives 104. More specifically, each logical volume 132 is implemented by one or more drive volumes 118 of one or more storage drives 104. However, the SAN software agent 128 does not provision or deprovision the drive volumes 118, but rather receives commands over the fabric 102 instructing the agent 128 which logical volumes 132 to commission, and which drive volume 118 of which storage drives 104 to employ in doing so.

The SAN manager 108 is a node of the SAN that can be its own computing device, similar to one of the computing devices 106. As such, the SAN manager 108 can be software and hardware. The SAN manager 108 can also be software that runs on one of the client computing devices 106, or even one of the storage drives 104 if the processing capability of the storage drive 104 in question is sufficient. The SAN manager 108 generally manages the drive volumes 118 allocated on the storage drives 104, as well as the logical volumes 132 allocated on the client computing devices 106 that are realized by the drive volumes 118. The SAN manager 108, however, does not effect data transfer between the client computing devices 106 and the drive volumes 118 of the storage drives 104 that implement the logical volumes 132 of the client computing devices 106; rather, the SAN software agents 126 do.

The SAN manager 108 thus issues commands to the storage drives 104 to provision and deprovision the drive volumes 118 thereon. The SAN manager 108 similarly issues commands to the SAN software agents 128 of the client computing devices 106 to commission and decommission the logical volumes 132 thereon using specified drive volumes 118 of the storage drives 104. Because the SAN manager 108 is not responsible for data transfer between the client computing devices 106 and the storage drives 104 having the drive volumes 118 implementing the logical volumes 132 of the client computing devices 106, the SAN manager 108 may further periodically request status information from the storage drives 104 and the client computing devices 106. The SAN manager 108 request status information from the storage drives 104 regarding their drive volumes 118, and from the SAN software agents 128 of the client computing devices 106 regarding their logical volumes 132. The SAN manager 108 cannot glean such status information from the data transferred between the client computing devices 106 and the storage drives 104, since it is not responsible for such data transfer, in contradistinction to a conventional SAN controller that is responsible for both volume management and data transfer.

The SAN manager 108 can maintain its own management logical volume 134 that is realized by one or more drive volumes 118 of one or more storage drives 104, similar to the logical volumes 132 that the SAN manager 108 manages on the client computing devices 106. In this respect, the SAN manager 108 is also a client to the (host) storage drives 104, because data of the management logical volume 134 is stored on one or more physical storage media 116 of one or more storage drives 104. The SAN manager 108 can store on the management logical volume 134 which drive volumes 118 have been provisioned on which storage drives 104, as well as other information regarding the drive volumes 118 and/or the storage drives 104. The SAN manager 108 can likewise store on the management logical volume 134 which logical volumes 132 have been commissioned on which client computing devices 106, and which drive volumes 118 of which storage drives 104 implement these logical volumes 132. The SAN manager can store other information regarding the logical volumes 132 and/or the client computing devices 106 on the management logical volume 134, too.

The management logical volume 134 is referred to as a "management" logical volume 134 just to distinguish it from the logical volumes 132 of the client computing devices 106. The SAN manager 108 may employ a management logical volume 134 that uses one or more physical storage media 116 of one or more storage drives 104 instead of its own locally attached storage. Metadata regarding the SAN, such as the metadata regarding the storage drives 104, the drive volumes 118 provisioned on the storage drives 104, the client computing devices 106, and the logical volumes 132 created and mounted on the client computing devices 106 using the drive volumes 118, can be stored on the management logical volume 134.

Figure 2:
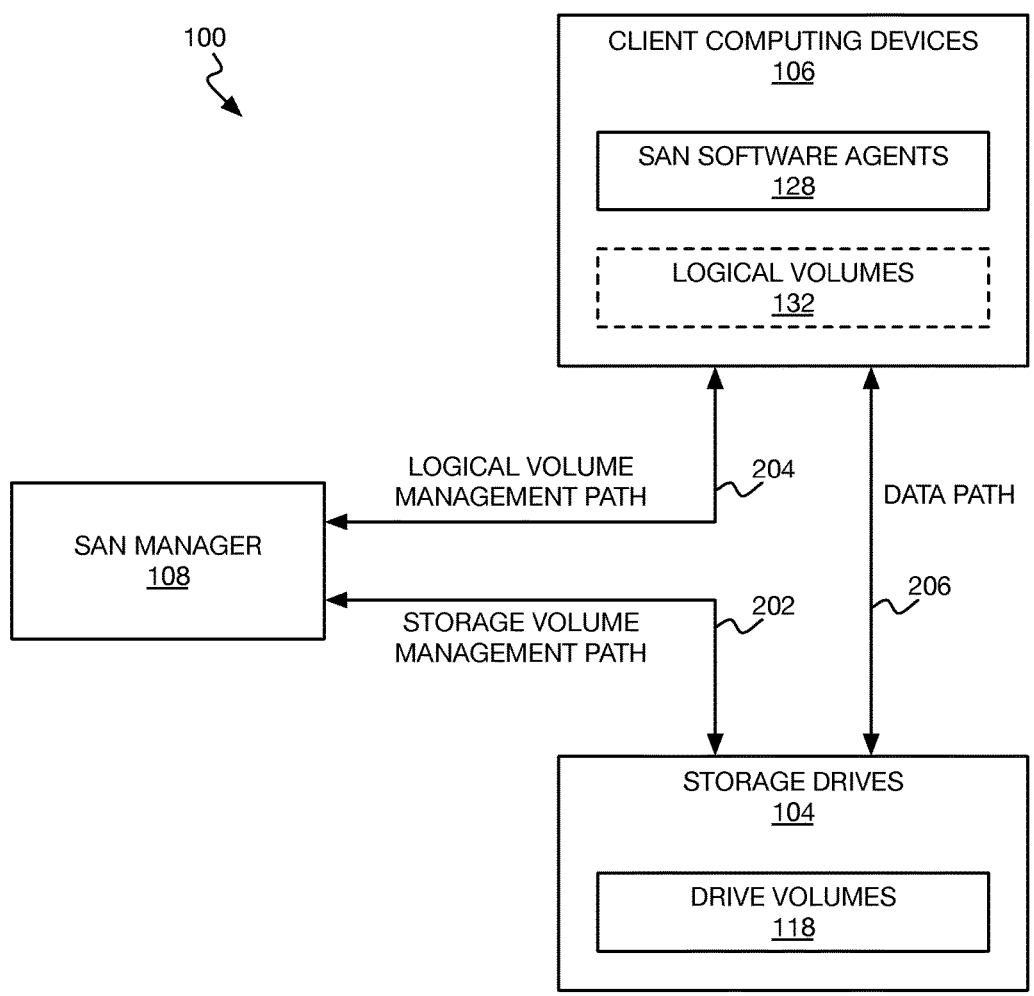
FIG. 2 is a diagram of the demarcation between control and data paths within an example distributed SAN system.

FIG. 2 shows how the example SAN system 100 is a distributed SAN system. The SAN manager 108 manages the drive volumes 118 on the storage drives 104, such that there is effectively a drive volume management path 202 between the SAN manager 108 and the storage drives 104. Each storage drive 104 can be said to operate just the drive volumes 118 physically stored on the storage drive 104. A storage drive 104 operates its drive volumes by 118 provisioning the drive volumes 118 as commissioned by the SAN manager 108 and by deprovisioning them as decommissioned by the SAN manager 108. A storage drive 104 may not be aware that there are other storage drives 104 within the SAN system 100, and/or may not be aware that the drive volumes 118 that it has provisioned is participating with drive volumes 118 of one or more other storage drives 104 to realize a logical volume 132 of a client computing device 106.

The SAN manager 108 manages the logical volumes 132 on the client computing devices 106 via the SAN software agents running on the computing devices 106, such that there is effectively a logical volume management path 204 between the SAN manager 108 and the SAN software agents 128 of the client computing devices 106.

The SAN software agent 128 of each client computing device 106 can be said to operate just the logical volumes 132 thereof. The SAN software agent 128 of a client computing device 106 operates its logical volumes 134 by commissioning or allocating the logical volumes 132 using the drive volumes on the storage drives 104 as directed by the SAN manager 108, and by decommissioning or deallocating the logical volumes 132 as directed by the SAN manager 108. The SAN software agent 128 of a client computing device 106 may not be aware that there are other SAN software agents of other client computing devices 106 within the SAN system 100.

I/O access between the client computing devices 106 and the storage drives 104 to access the data of the logical volumes 132 physically stored on the drive volumes 118 occurs directly by the SAN software agents 128 of the client computing devices 106 (such by the logical volume managers 130 thereof) and does not involve the SAN manager 108. As such, there is effectively a data path 206 between the SAN software agents 128 of the client computing devices 106 and the storage drives 104. In this respect, it is noted that when the SAN manager 108 instructs the SAN software agent 128 of a client computing device 106 to commission a logical volume 132 using one or more specific drive volumes 118 of one or more specific storage drives 104, the software agent 128 does not itself provision (or subsequently deprovision) the drive volumes 118 on the storage drives 104. Rather, the SAN manager 108 does, and then instructs the SAN software agent 128 as to which drive volumes 118 on which storage drives 104 to subsequently use when accessing data of the logical volume 132 that the software agent 128 has been instructed to commission.

The SAN software agent 128 of each client computing device 106 is thus to operate the logical volumes 132 realized by the drive volumes 118 of the storage drives 104 by directly accessing the drive volumes 118 responsive to I/O requests generated within the client computing device 106. Likewise, each storage drive 104 is to operate the drive volumes 118 thereof by directly responding to access of its drive volumes 118 by the SAN software agents 128 of the client computing devices 106. Each storage drive 104 operates just its own drive volumes 118, and not those of other storage drives 104. The SAN software agent 128 of each client computing device 106 operates the logical volumes 132 thereof, and not those of other client computing devices 106.

Figure 3:
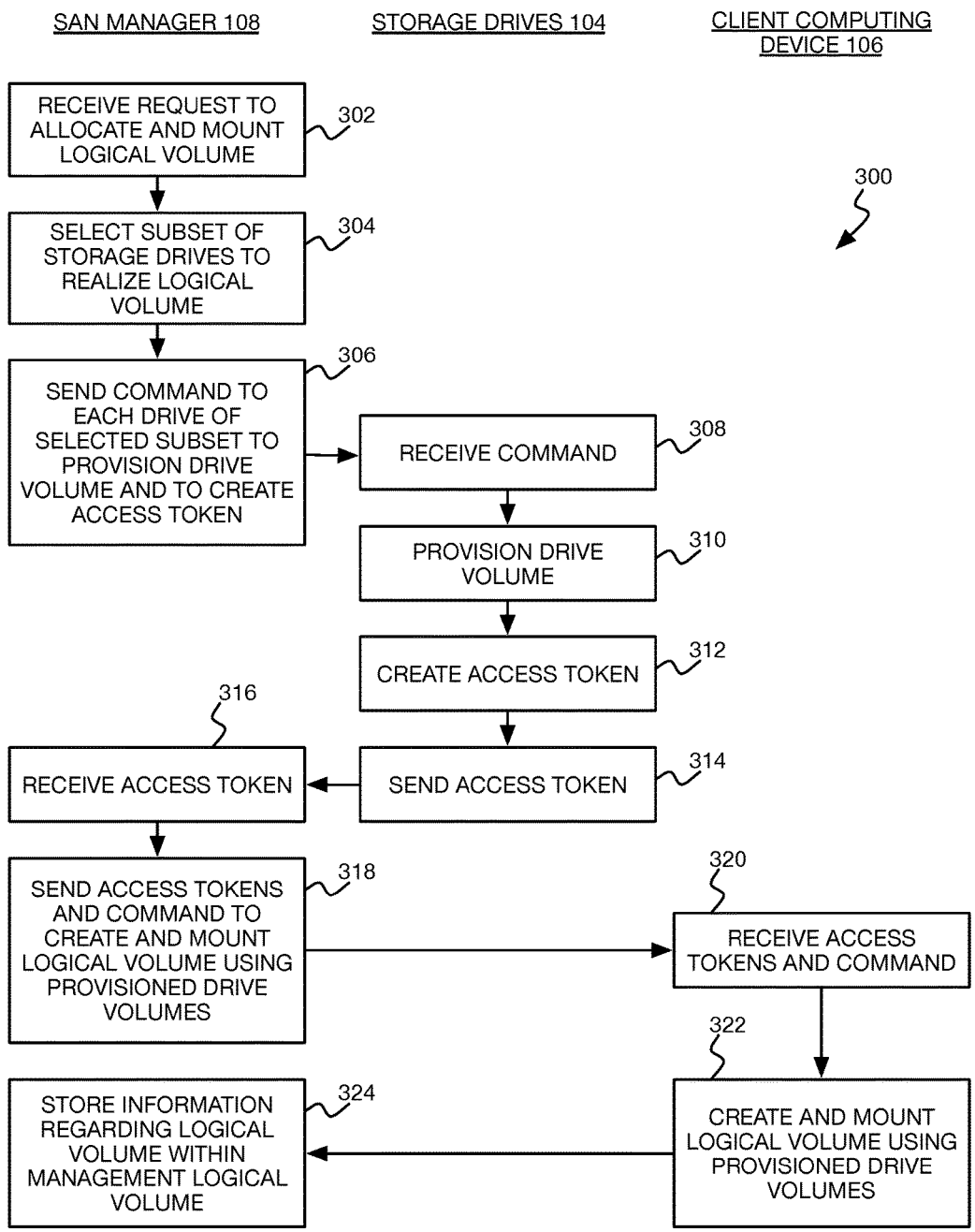
FIG. 3 is a flowchart of an example method to commission a logical drive volume on a client computing device of a distributed SAN system using drive volumes on storage drives of the distributed SAN system, in which the client computing device receives access security tokens for the drive volumes from a SAN manager.

FIG. 3 shows an example method 300 for commissioning a logical volume on a client computing device 106 using drive volumes on storage drives 104 within the SAN system 100, in which access security tokens are created by the storage drives 104 and provided to the client computing device 106 by the SAN manager 108. The method 300 is divided into three columns corresponding to the SAN manager 108, the storage drives 104, and the client computing device 106. The SAN manager 108 performs the parts of the method 300 in the left column; the storage drives 104 perform the parts of the method 300 in the right column; and the client computing device 106 (more specifically, the SAN software agent 128 thereof, in conjunction with the logical volume manager 130 thereof) performs the parts of the method 300 in the right column.

The SAN manager 108 receives from an administrator a request to allocate and mount a logical volume on the client computing device 106 (302). For example, the SAN manager 108 may expose a web interface by which an administrator logs onto the SAN manager 108 via a different computing device over a network to provide this information. The SAN manager 108 may provide for direct local control by the administrator, such as by a directly connected display device and an input device. The request can specify at least characteristics regarding the logical volume to be created, such as the client computing device 106 on which the logical volume is to be created and the size of the logical volume.

The SAN manager 108 selects a subset of the storage drives 104 to realize the requested logical volume on the client computing device 106 (304). The storage drives may be specified within the request. In another implementation, the SAN manager 108 may itself select a subset of the storage drives 104 that can implement the requested logical volume in satisfaction of the specified characteristics of the logical volume. The SAN manager 108 can make this selection because it stores information regarding the storage drives 104 within the management logical volume.

The SAN manager 108 sends a command to each storage drive 104 of the selected subset to provision a drive volume on the storage drive 104 and to create an access security token for the drive volume (306). Each storage drive 104 within the selected subset receives the command (308), and responsively provisions the requested drive volume (310) and creates an access security token for the provisioned drive volume (312). Each storage drive 104 sends the access security token that it created for the drive volume that it has provisioned to the SAN manager 108 (314), which receives the access token from each storage drive 104 of the selected subset (316).

The access security token of each storage drive 104 of the selected subset is particular to the provisioned drive volume on the storage drive 104 in question. A storage drive 104 can have multiple drive volumes, and therefore can create multiple access security tokens, where each access token is specific or particular to one of the drive volumes provisioned on the storage drive 104. A logical volume can be realized over multiple drive volumes, where each drive volume can be stored on a different storage drive 104. Therefore, there is a separate access security token for each drive volume over which the logical volume is realized.

Presentment of an access security token for a drive volume of a storage drive 104 to the storage drive 104 permits access to the drive volume, such as to data stored on the drive volume. If the correct access security token is not presented with a drive volume request to the storage drive 104—for instance, if no access token is presented, or if the incorrect access token is presented—then the storage drive 104 will not honor the request. Therefore, the security token is an access security token because it permits the holder of the token to access a corresponding drive volume on a storage drive 104. Possession of a given access security token permits access just to a specific drive volume on a particular storage drive 104, and not to any other drive volumes on this storage drive 104, or any drive volume on any other storage drive 104.

An access security token is generally specific data that is used to prove that the holder of the token is permitted to access a corresponding drive volume of a storage drive 104. The access security token may be as simple as a random series of bits or bytes of sufficient length, such as a random number within a range of numbers of sufficient size, that guessing the access security token is statistically near impossible. The access security token may be more sophisticated than such a random series of bits or bytes. For instance, the access security token may be a cryptographic key, such as a digital signature.

The SAN manager 108 sends the access security tokens received from the storage drives 104 of the selected subset along with a command to create and mount a logical volume using the provisioned drive volumes to which the access tokens correspond to the client computing device 106 (318). The command instructs the client computing device 106 to create and mount the logical volume with the characteristics requested in part 302. The client computing device 106 receives the command and the access security tokens (320), and responsively creates and mounts the logical volume with the requested characteristics using the provisioned drive volumes on the storage drives 104 of the selected subset (322). In creating the logical volume using the provisioned drive volumes, the client computing device 106 is able and permitted to access the drive volumes because the device 106 has received the access security tokens for the drive volumes from the SAN manager 108.

The command and the access tokens may be sent as part of the same message from the SAN manager 108 to the client computing device 106. For instance, a secure message employing encryption may be used. The command and the access tokens may be sent in two messages. The command and the access tokens may be sent using different communication modalities as well. For example, the command may be sent in a message from the SAN manager 108 to the client computing device 106, whereas the access tokens may be provided by the SAN manager 108 logging onto the client computing device 106, and/or by accessing a particular application programming interface (API) of the device 106.

The SAN manager 108 stores information regarding the logical volume within the management logical volume (324). This information includes information regarding the client computing device 106 on which the logical volume has been created and mounted, such as its address on the fabric 102, its host name, the operating system running on the client computing device 106, and so on. The information includes a description the logical volume as well, such as the identity of the drive volumes used to form the logical volume, the higher-level storage functionality that the logical volume realizes, path names of device entries associated with the logical volume on the client computing device 106, and path names at which the logical volume is currently mounted on the client computing device 106, and so on. Other such information can include a description of a replication target, if the logical volume is being replicated to remote storage. The information can include the access security tokens of the drive volumes that make up the logical volume.

The method 300 results in the SAN manager 108 being able to access the drive volumes provisioned on the storage drives 104, in addition to the client computing device 106. This is because the SAN manager 108 receives the access security tokens from the storage drives 104 in part 316; that is, in the method 300, the SAN manager 108 is an intermediary between the storage drives 104 and the client computing device 106 as to the transfer of the access tokens from the former to the latter. The client computing device 106 does receive the access security tokens directly from the storage drives 104, but rather receives the access tokens indirectly therefrom, via the SAN manager 108. The SAN manager 108 thus has access to the data stored on the logical volume that is realized using the drive volumes.

Figure 4:
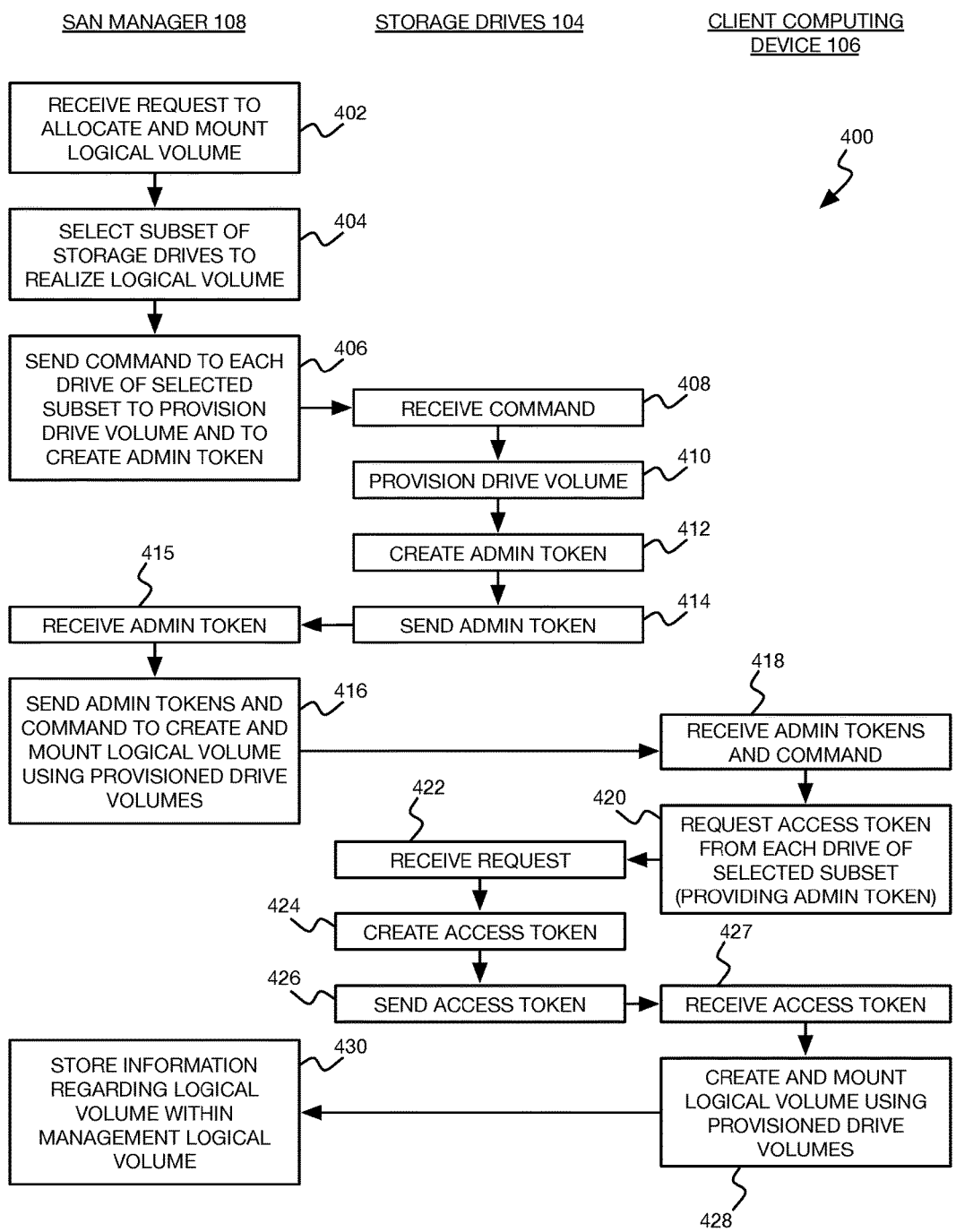
FIG. 4 is a flowchart of an example method to commission a logical drive volume on a client computing device of a distributed SAN system using drive volumes on storage drives of the distributed SAN system, in which the client computing device receives access security tokens for the drive volumes from the storage drives.

By comparison, FIG. 4 shows an example method 400 for commissioning a logical volume on a client computing device 106 using drive volumes on storage drives 104 within the SAN system 100, in which access security tokens are created by the storage drives 104 and provided to the client computing device 106 directly by the drives 104. The method 400 is divided into three columns corresponding to the SAN manager 108, the storage drives 104, and the client computing device 106. The SAN manager 108 performs the parts of the method 400 in the left column; the storage drives 104 perform the parts of the method 400 in the right column; and the client computing device 106 (more specifically, the SAN software agent 128 thereof, in conjunction with the logical volume manager 130 thereof) performs the parts of the method 300 in the right column.

The SAN manager 108 receives from an administrator a request to allocate and mount a logical volume on the client computing device 106 (402), as in the method 300. Likewise, the SAN manager 108 selects a subset of the storage drives 104 to realize the requested logical volume on the client computing device 106 (304), as in the method 300. The SAN manager 108 sends a command to each storage drive 104 of the selected subset to provision a drive volume on the storage drive 104 and to create an administrator security token for the drive volume (406).

Each storage drive 104 within the selected subset receives the command (408), and responsively provisions the requested drive volume (410) and creates an administrator security token for the provisioned drive volume (412). Each storage drive 104 sends the administrator security token that it created for the drive volume that it has provisioned to the SAN manager 108 (414). The SAN manager 108 thus receives an administrator security token from each storage drive 104 of the selected subset (415).

Like the access security token that has been described, the administrator security token of each storage drive 104 of the selected subset is particular to the provisioned drive volume on the storage drive 104 in question. There is thus a separate administrator security token for each drive volume of each storage drive 104 over which the logical volume is realized. However, unlike an access security token, an administrator security token does not permit access to the drive volume, such as to data stored on the drive volume.

Rather, presentment of an administrator security token for a drive volume of a storage drive 104 to the storage drive 104 permits acquisition of an access security token for the drive volume, where subsequent presentment of the access security token permits access to the drive volume as in the method 300. The storage drive 104 may create and return an access security token for a drive volume responsive to presentment of an administrator security token just once—i.e., just the first time a particular administrator security token is presented to the storage drive 104. Subsequent presentments of the administrator security token to the storage drive 104 do not result in the storage drive 104 returning an access security token for a drive volume; rather, such subsequent presentments of the administrator token are refused.

An administrator security token is generally specific data that is used to prove that the holder of the token is permitted to acquire an access security token that does directly provide access to a corresponding drive volume of a storage drive 104. Like an access security token, an administrator token may be as simple as a random series of bits or bytes of sufficient length, or may be more sophisticated than such a random series. The administrator security token for a drive volume is a different token than the access security token for the same drive volume.

The SAN manager 108 sends the administrator security tokens received from the storage drives 104 of the selected subset along with a command to create and mount a logical volume using the provisioned drive volumes to which the administrator tokens correspond to the client computing device 106 (416). The command instructions the client computing device 106 to create and mount the logical volume with the characteristics requested in part 402. The client computing device 106 receives the command and the administrator security tokens (418). Similar to the method 300, the command and the administrator tokens may be sent as part of the same message from the SAN manager 108 to the client computing device 106, as parts of different messages, or by using different communication modalities.

Upon receiving the administrator security tokens, the client computing device 106 sends to each storage drive 104 of the subset a request for the access security token for the provisioned drive volume of the storage drive 104 in question that the device 106 will use to create the logical volume (420). As noted above, a storage drive 104 will not honor a request for an access security token for a drive volume unless it is accompanied by the administrator security token for the drive volume. Therefore, in sending the requests in part 420, the client computing device 106 provides the administrator security tokens that the device 106 received from the SAN manager 108.

Each storage drive 104 within the subset receives a request from the client computing device 106 for an access security token for the drive volume that it provisioned (422). Upon authenticating the administrator security token provided with the request, a storage drive 104 can create an access security token for the drive volume to which the administrator token corresponds (424), and return the access token to the client computing device (426). Authentication can include that an administrator security token has been provided; that the provided administrator token is the correct administrator token for the drive volume identified in the received request; and that this administrator token has not already been presented by the client computing device 106 or any other device.

The client computing device 106 receives an access security token from each storage drive 104 of the selected subset (427). Once the client computing device 106 receives the access security tokens for all the drive volumes over which the device 106 is to create a logical volume, the client computing device 106 creates and mounts the logical volume with the requested characteristics using the provisioned drive volumes on the storage drives 104 of the selected subset (428). In creating the logical volume using the provisioned drive volumes, the client computing device 106 is able and permitted to access the drive volumes because the device 106 has received the access security tokens for the drive volumes directly from the storage drives 104.

The SAN manager 108 also stores information regarding the logical volume within the management logical volume (430), similar to as in the method 300. However, the stored information may not include the access security tokens of the drive volumes that make up the logical volume. This is because the SAN manager 108 did not receive the access security tokens from the storage drives 104, and the client computing device 106, which did receive the access tokens from the storage drives 104, may not share the access tokens with the SAN manager 108. The stored information may include, though, the administrator security tokens of the drive volumes for the logical volume.

The method 400 results in the SAN manager 108 being unable to access the drive volumes provisioned on the storage drives 104, unless the client computing device 106 shares the access security tokens for the drive volumes with the SAN manager 108. This is because the SAN manager 108 does not receive the access security tokens from the storage drives 104 in the method 400, and just receives the administrator security tokens from the storage drives 104. However, the administrator security tokens by themselves are insufficient to secure access to their corresponding drive volumes. Rather, the administrator security tokens just permit the acquisition of the access security tokens that do directly permit access to their corresponding drive volumes. Because each administrator security token can be a single-use token, once the client computing device 106 has redeemed an administrator token for a corresponding drive volume to receive the access security token for this drive volume, subsequent presentment of the administrator token is not honored by the storage drive 104.

The method 400 further can ensure that the client computing device 106 does not attempt to store data on a logical volume that uses a compromised drive volume, because the client computing device 106 will be unable to create such a logical volume. For instance, in the method 400 there is nothing that prevents the SAN manager 108 from using the administrator security token for a drive volume received in part 415 from a storage drive 104 to itself acquire an access security token for the drive volume. However, if the SAN manager 108 does so, the subsequent request by the client computing device 106 for the access security token for the drive volume, via presentment of this same administrator security token, will not be honored by the storage drive 104. This means that the SAN manager 108 will have access to the drive volume but the client computing device 106 will not have ever had access to the drive volume. As such, the SAN manager 108 has access to a drive volume on which the client computing device 106 has not yet stored any data, rendering such access by the SAN manager 108 meaningless from a security perspective.

Figure 5:
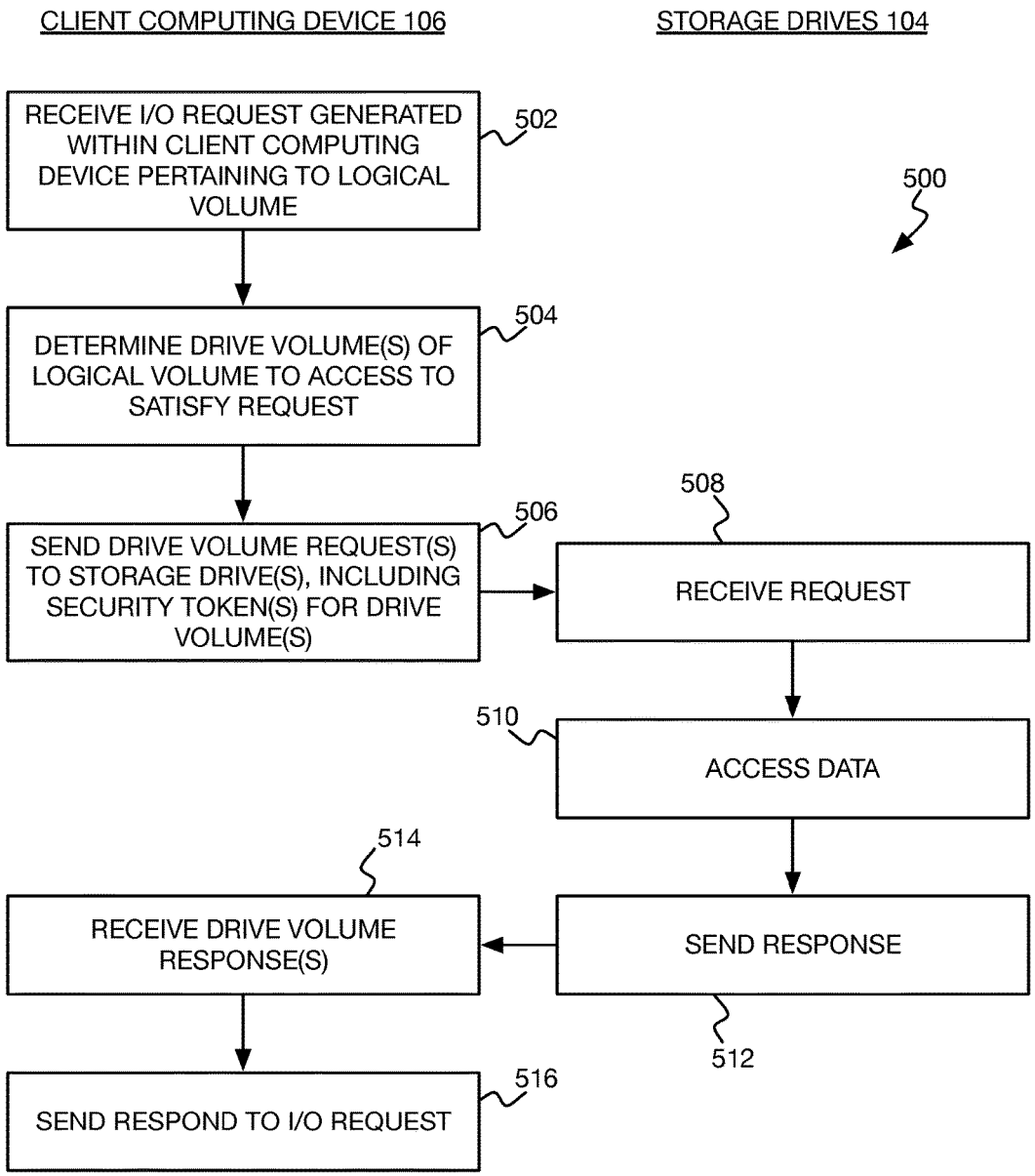
FIG. 5 is a flowchart of an example method to perform input/output (I/O) requests in relation to a logical drive volume of a client computing device of a distributed SAN system that is realized by drive volumes on storage drives of the distributed SAN system, using access security tokens.

FIG. 5 shows an example method 500 for using a logical volume on a client computing device 106 that has been implemented via drive volumes on storage drives 104 within the SAN system 100, using access security tokens. The method 500 is divided into two columns corresponding to the client computing device 106 on which the logical volume has been allocated and mounted and the storage drives 106 on which the drive volumes that realize the logical volume have been provisioned. The client computing device 106 (more specifically the SAN software agent 128 thereof, in conjunction with the logical volume manager 130 thereof) performs the parts of the method 500 in the left column; and the storage drives 104 perform the parts of the method 500 in the right column.

The client computing device 106 receives an I/O request generated within the client computing device 106 itself that pertains to the logical volume (502). For example, an application program running on the client computing device 106 may generate the I/O request. The I/O request may be a request to read data from the logical volume, write data to the logical volume, or update data already stored on the logical volume. The latter request is a type of write request.

The client computing device 106 accesses the drive volumes on the storage drives 104 for the logical volume in satisfaction of the I/O request. In accessing the drive volumes, the client computing device 106 realizes any higher-level storage functionality that has been specified for the logical volume in question. For instance, the client computing device 106 can perform a software RAID approach when writing data to the logical volume if such higher-level storage functionality has been specified.

Therefore, the client computing device 106 can determine the drive volume(s) of the logical volume to access to satisfy the I/O request (504). If the I/O request is a read request, not all the drive volumes making up the logical volume may have to be accessed; rather, just the drive volume that stores the data being requested may have to be accessed. If the I/O request is a write request, similarly, not all the drive volumes making up the logical volume may have to be accessed. For example, for a software RAID approach, just the drive volume storing the data and the drive volume storing parity information for this data may have to be accessed.

The client computing device 106 thus sends drive volume requests to the storage drives 104 having the drive volumes to be accessed to satisfy the I/O request (506). As part of each drive volume request, the client computing device 106 includes the access security key for the drive volume to which the request pertains so that the storage drive 104 in question will honor the request. The access security key is that previously received from the SAN manager 108 if the method 300 was performed, or is that previously received from the storage drive 108 directly if the method 400 was performed.

Each storage drive 104 to which the client computing device 106 has sent a request receives the request (508). Upon authenticating the access security token provided within the request, a storage drive 104 accesses data on its drive volume pursuant to the request (510), and sends a response (512). Authentication can include that an access security token has been provided; and that the provided access token is the correct access token for the drive volume identified in the received request. Furthermore, for a read request, a storage drive may retrieve the requested data from the drive volume and return the requested data to the client computing device 106. For a write request, a storage drive may write the requested data to the drive volume and return a confirmation that the requested data has been written.

The client computing device 106 receives the drive volume responses from the storage drives 104 (514), and sends a response to the application program or other program within the client computing device 106 that generated the I/O request (516). In usage of a logical drive within the SAN system 100, therefore, the SAN manager 108 does not participate. Rather, the client computing device 106 itself directly interacts with the storage drives 104. The client computing device 106 is permitted to access just the drive volumes on the storage drives 104 for which the device 106 has corresponding access security keys, and cannot access other drives on the same or different storage drives 104 for which the device 106 does not have corresponding access keys.

Figure 6:
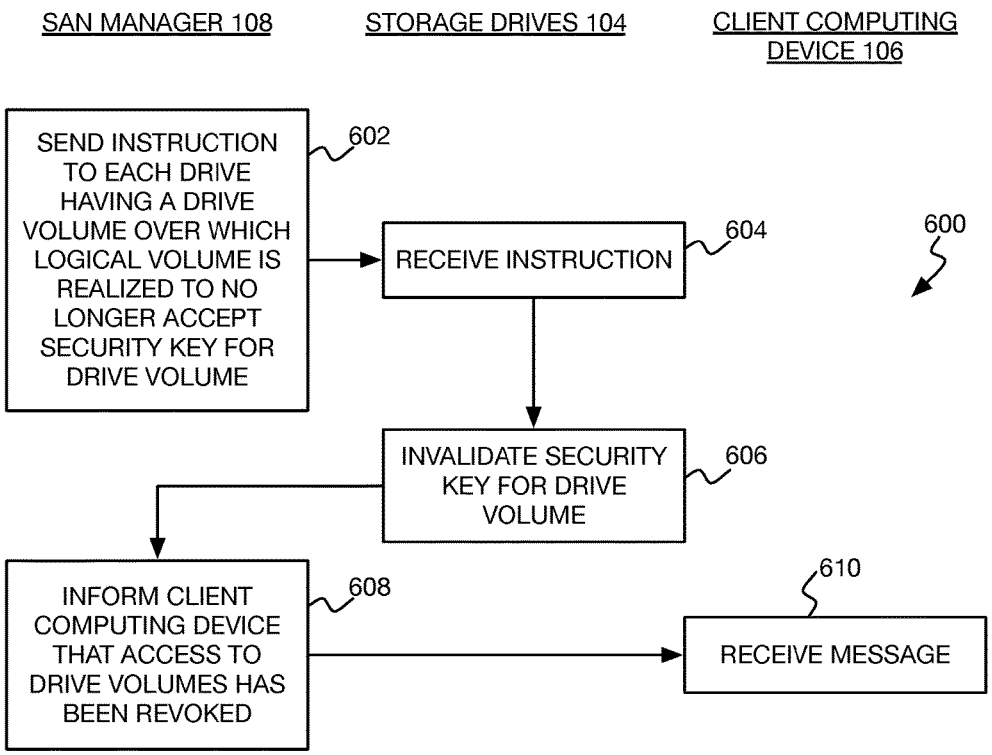
FIG. 6 is a flowchart of an example method to revoke authorization for a client computing device to use the drive volumes over which a logical volume has been realized.

FIG. 6 shows an example method 600 for revoking authorization from a client computing device 106 to use the drive volumes provisioned on the storage drives 104 over which the client computing device 106 has created and mounted a logical volume. There are different reasons why authorization may be revoked from the client computing device. For example, the client computing device 106 may be decommissioned from service, such that the client device 106 should no longer have access the drive volumes in question. As another example, the application program running on the client computing device 106 that is using the logical volume realized over the drive volumes may no longer be running on the client device 106.

The method 600 is divided into three columns corresponding to the SAN manager 108, the storage drives 104, and the client computing devices 106. The SAN manager 108 performs the parts of the method 600 in the left column, and the storage drives 104 perform the parts of the method 600 in the middle column. The client computing devices 106 (more specifically the SAN software agents 128 thereof, in conjunction with the logical volume managers 130 thereof) perform the parts of the method 600 in the right column.

The SAN manager 108 sends an instruction to each storage drive 104 having a drive volume over which the logical volume is realized (602), to longer accept any security key for the drive volume in question. If a storage drive 104 sent an access security key for such a drive volume directly to the SAN manager 108, per the method 300, then the instruction is to no longer accept the access security key. The instruction may include the access security key, or may identify the client computing device 106 to which the SAN manager 108 previously sent the access security key. This information can be included to assist the storage drive 104 in identifying which access security key to no longer honor, if there are multiple access security keys for the drive volume for usage by multiple client computing devices.

By comparison, if a storage drive 104 sent an administrator security key for such a drive volume to the SAN manager 108, per the method 400, then the instruction is to no longer accept the administrator security key, nor an access security key created responsive to presentment of the administrator security key. That is, the SAN manager 108 may have no way of determining if the client computing device 106 (or another device) has presented the administrator security key for the drive volume and has thus received an access security key for the drive volume. Therefore, the SAN manager 108 instructs the storage drive 104 not to accept either security key, even though in the case in which the administrator key has not yet been presented to the storage drive 104 the access key will have not yet been created, and even though in the case in which the access key has been created the administrator key may already no longer be valid. The instruction may include the administrator security key, or may identify the client computing device 106 to which the SAN manager 108 previously sent the administrator security key. This information can be included to assist the storage drive 104 in identifying which access security key to no longer honor, if the drive volume is being used by multiple client computing devices.

Each storage drive 104 having a drive volume over which the logical volume is realized thus receives the instruction (604), and invalidates the security key (606). If the SAN manager 108 directed provided an access security key to the client computing device 106 for the drive volume, per the method 300, then a storage drive 104 invalidates this access key. If the SAN manager 108 directly provided an administrator security key to the client computing device 106 for the drive volume, per the method 400, then a storage drive 104 invalidates this administrator key if it is still valid, and otherwise invalidates the access security key created responsive to presentment of the administrator key (such that creation of the access key already resulted in invalidation of the administrator key). A storage drive 104 may not invalidate other security keys—i.e., administrator security keys or access security keys—for the drive volume, if other such security keys have been created so other client computing devices can access the drive volume.

The SAN manager 108 also informs the client computing device 106 that access to the drive volumes over which the logical volume is realized has been revoked (608). The client computing device 106 thus receives this message (610). If the client computing device 106 has to again be authorized for usage of the drive volumes, the client can be reauthorized in accordance with the method 300 or the method 400.

The techniques that have been disclosed herein therefore provide for security within a novel distributed SAN. A less complex and thus easier to implement technique can involve the SAN manager 108 itself providing access security keys to client computing devices 106. A more secure technique can involve the client computing devices 106 receiving access security keys directly from the storage drives 104. However, this latter technique employs the usage of administrator security keys, and thus is more complex.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage drives. The recitation of a "security key" as used herein, without a preceding descriptor of "access" or "administrator," encompasses both and either an access security key and an administrator security key. It is manifestly intended that this invention be limited only by the claims and equivalents thereof.

We claim:

1. A storage-area network (SAN) system comprising:
   one or more fabric-attachable storage drives directly connected to a fabric, each storage drive to provision and operate a drive volume, and to create a security token for the drive volume;
   a client computing device directly connected to the fabric, and that is to execute a SAN software agent to create, mount, and use a logical volume realized by drive volumes of the storage drives, the client computing device accessing each drive volume using the security token for the drive volume; and
   a SAN manager directly connected to the fabric and that is to manage the drive volumes of the storage drives, to manage the logical volume that the SAN software agent operates, to receive from each storage drive the security token for the drive volume of the storage drive, and to send the security token for the drive volume of each storage drive to the SAN software agent.

2. The SAN system of claim 1, wherein the security token of each storage drive is specific to the drive volume provisioned on the storage drive.

3. The SAN system of claim 1, wherein the security token of each storage drive is an access security token that the storage drive creates and that directly permits access to the drive volume provisioned on the storage drive,
   and wherein the SAN software agent creates and mounts the logical volume using the drive volumes provisioned on the storage drives of the subset by accessing the drive volumes provisioned on each storage drive via the security token for the drive volume of the storage drive.

4. The SAN system of claim 3, wherein the SAN manager has access to data of the logical volume stored on the drive volumes provisioned on the storage drives.

5. The SAN system of claim 1, wherein the security token of each storage drive is an administrator security token that permits acquisition of an access security token that directly permits access to the drive volume provisioned on the storage drive,
   wherein the SAN software agent requests the access security token of each storage drive by providing the storage drive with the administrator security token of the storage drive,
   wherein each storage drive, responsive to receiving the administrator security token of the storage drive, from the SAN software agent, creates the access security token that directly permits access to the drive volume provisioned on the storage drive, and sends the access security token to the SAN software agent,
   and wherein the SAN software agent, responsive to receiving the access security token from each storage drive, creates and mounts the logical volume using the drive volumes provisioned on the storage drives by accessing the drive volume on each storage drive via the access security token of the storage drive.

6. The SAN system of claim 5, wherein the administrator security token of each storage drive permits acquisition of the access security token of the storage drive a single time.

7. The SAN system of claim 5, wherein the SAN software agent does not share the access security token of each storage drive with the SAN manager,
   and wherein the SAN manager has no access to the data of the logical volume stored on the drive volumes provisioned on the storage drives.

8. A method comprising:
   receiving, by a storage-area network (SAN) manager running on a computing device directly connected to a fabric, a request from an administrator to allocate and mount a logical volume on a client computing device directly connected to the fabric;
   sending, by the SAN manager, a command to each storage drive of one or more storage drives to provision a drive volume to store data of the logical volume, each storage drive directly connected to the fabric;
   receiving, by the SAN manager, a security token from each storage drive, the security token of each storage drive permitting access to the drive volume provisioned on the storage drive; and
   sending, by the SAN manager, the security token of each storage drive and a command to a SAN software agent on the client computing device to create and mount the logical volume using the drive volumes provisioned on the storage drives.

9. The method of claim 8, wherein the security token of each storage drive is an access security token that directly permits access to the drive volume provisioned on the storage drive,
   and wherein the SAN software agent creates and mounts the logical volume using the drive volumes provisioned on the storage drives by accessing the drive volume provisioned on each storage drive via the security token of the storage drive.

10. The method of claim 9, wherein the SAN manager has access to the data of the logical volume stored on the drive volumes provisioned on the storage drives.

11. The method of claim 9, further comprising revoking, by the SAN manager, authorization from the client computing device to use the drive volumes provisioned on the storage drives by:
    sending to each storage drive an instruction to no longer accept the security token for the drive volume provisioned on the storage drive; and
    informing the client computing device that access to the drive volumes provisioned on the storage drives by the client computing device has been revoked.

12. The method of claim 8, wherein the security token of each storage drive is an administrator security token that permits acquisition of an access security token that directly permits access to the drive volume provisioned on the storage drive,
    wherein the SAN software agent requests the access security token of each storage drive by providing the storage drive with the administrator security token of the storage drive,
    and wherein the SAN software agent creates and mounts the logical volume using the drive volumes provisioned on the storage drives by accessing the drive volume provisioned on each storage drive via the access security token of the storage drive.

13. The method of claim 12, wherein the SAN software agent does not share the access security token of each storage drive with the SAN manager,
    and wherein the SAN manager has no access to the data of the logical volume stored on the drive volumes provisioned on the storage drives.

14. The method of claim 12, further comprising revoking, by the SAN manager, authorization from the client computing device to use the drive volumes provisioned on the storage drives by:
    sending to each storage drive an instruction to:
       no longer accept the administrator security token that permits acquisition of the access security token that directly permits access to the drive volume provisioned on the storage drive;
       no longer accept the access security token for the drive volume provisioned on the storage drive; and
    informing the client computing device that access to the drive volumes provisioned on the storage drives by the client computing device has been revoked.

15. A non-transitory computer-readable data storage medium storing computer-executable code that a client computing device executes to perform a method comprising:
    receiving, by a storage-area network (SAN) software agent running on the client computing device and from a SAN manager directly connected to a fabric to which the client computing device is connected, a command to create and mount a logical volume using one or more drive volumes provisioned on corresponding storage drives directly connected to the fabric;
    receiving, by the SAN software agent running on the client computing device, a security token of each storage drive for the drive volume provisioned on the storage drive; and
    in response to receiving the command and the security token of each storage drive for the drive volume provisioned on the storage drive, creating and mounting, by the SAN software agent, the logical volume using the drive volumes provisioned on the storage drives, via the security tokens of the storage drives for the drive volumes.

16. The non-transitory computer-readable data storage medium of claim 15, wherein the security token of each storage drive is an access security token that directly permits access to the drive volume provisioned on the storage drive,
    and wherein the SAN software agent creates and mounts the logical volume using the drive volumes provisioned on the storage drives by accessing the drive volume provisioned on each storage drive via the security token of the storage drive.

17. The non-transitory computer-readable data storage medium of claim 16, wherein the method further comprises:
    receiving, by the SAN software agent, an input/output (I/O) request generated within the client computing device and pertaining to the logical volume; and
    in response to receiving the I/O request, accessing the drive volumes provisioned on the storage drives for the logical volume in satisfaction of the I/O request via the security tokens of the storage drives,
    wherein the SAN manager has access to the data of the logical volume stored on the drive volumes provisioned on the storage drives.

18. The non-transitory computer-readable data storage medium of claim 15, wherein security token of each storage drive is an administrator security token that permits acquisition of an access security token that directly permits access to the drive volume provisioned on the storage drive, the method further comprising:
    requesting, by the SAN software agent, the access security token of each storage drive by providing the storage drive with the administrator security token of the storage drive; and responsively receiving, by the SAN software agent, the access security token of each storage drive from the storage drive, wherein the SAN software agent creates and mounts the logical volume using the drive volumes provisioned on the storage drives by accessing the drive volume on each storage drive via the access security token of the storage drive.

19. The non-transitory computer-readable data storage medium of claim 18, wherein the method further comprises:

receiving, by the SAN software agent, an input/output (I/O) request generated within the client computing device and pertaining to the logical volume; and in response to receiving the I/O request, accessing the drive volumes provisioned on the storage drives for the logical volume in satisfaction of the I/O request via the access security tokens of the storage drives, wherein the SAN software agent does not share the access security token of each storage drive with the SAN manager, and wherein the SAN manager has no access to the data of the logical volume stored on the drive volumes provisioned on the storage drives.

\* \* \* \* \*